(12) United States Patent
Jackson et al.

(10) Patent No.: US 10,306,010 B2
(45) Date of Patent: *May 28, 2019

(54) INFERRING SOCIAL GROUPS THROUGH PATTERNS OF COMMUNICATION

(71) Applicant: Google Inc., Mountain View, CA (US)

(72) Inventors: Dean Kenneth Jackson, Pittsburgh, PA (US); Daniel Victor Klein, Pittsburgh, PA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/297,501

(22) Filed: Oct. 19, 2016

(65) Prior Publication Data

US 2017/0054825 A1 Feb. 23, 2017

Related U.S. Application Data

(63) Continuation of application No. 13/956,332, filed on Jul. 31, 2013, now Pat. No. 9,495,660.

(51) Int. Cl.
| | |
|---|---|
| *G06F 15/16* | (2006.01) |
| *H04L 29/08* | (2006.01) |
| *G06F 15/173* | (2006.01) |
| *G06Q 10/10* | (2012.01) |
| *G06F 16/2457* | (2019.01) |
| *G06Q 50/00* | (2012.01) |
| *H04L 12/58* | (2006.01) |

(52) U.S. Cl.
CPC ...... *H04L 67/306* (2013.01); *G06F 15/17306* (2013.01); *G06F 16/24578* (2019.01); *G06Q 10/10* (2013.01); *G06Q 50/01* (2013.01); *H04L 51/14* (2013.01); *H04L 51/20* (2013.01); *H04L 51/32* (2013.01); *H04L 67/18* (2013.01)

(58) Field of Classification Search
CPC ..... G06Q 10/10; G06Q 50/01; G06F 17/3053
USPC .......................... 709/206, 204; 707/728, 769
See application file for complete search history.

(56) References Cited

U.S. PATENT DOCUMENTS

| | | | |
|---|---|---|---|
| 2006/0184997 A1* | 8/2006 | La Rotonda ........... | G06Q 10/10 726/2 |
| 2009/0177744 A1 | 9/2009 | Marlow et al. | |
| 2009/0235335 A1 | 9/2009 | Mendiola | |
| 2010/0205546 A1 | 8/2010 | Appelman et al. | |

(Continued)

OTHER PUBLICATIONS

EP Search Report for EP Application No. 14832946.9, 8 pages, dated Jan. 2, 2017.

(Continued)

*Primary Examiner* — Kyung H Shin
(74) *Attorney, Agent, or Firm* — Lowenstein Sandler LLP

(57) ABSTRACT

Implementations of the disclosure describe inferring social groups through patterns of communication. A method of the disclosure includes ascertaining, by a processing device, a proposed group of contacts from contacts of the user based on a correlation in geographic locations of communications between the user and the proposed group of contacts and a correlation in a type of medium of the communications, providing a recommendation that the user create a new list of contacts associated with the user from the proposed group of contacts, and responsive to the user indicating acceptance of the recommendation, creating the new list of contacts associated with the user from the proposed group.

21 Claims, 9 Drawing Sheets

(56) References Cited

U.S. PATENT DOCUMENTS

| | | | |
|---|---|---|---|
| 2011/0110096 A1 | 5/2011 | Hong et al. | |
| 2011/0213785 A1 | 9/2011 | Kristiansson et al. | |
| 2012/0110096 A1* | 5/2012 | Smarr | G06Q 10/10 709/206 |
| 2012/0323909 A1* | 12/2012 | Behforooz | G06Q 50/01 707/728 |

OTHER PUBLICATIONS

USPTO, Office Action for U.S. Appl. No. 13/956,332, dated Jun. 16, 2015.

USPTO, Final Office Action for U.S. Appl. No. 13/956,332, dated Nov. 20, 2015.

USPTO, Office Action for U.S. Appl. No. 13/956,332, dated Mar. 9, 2016.

USPTO, Notice of Allowance for U.S. Appl. No. 13/956,332, dated Jul. 12, 2016.

Yoav Soham, "Rethinking Lists, Groups and Circles" TechCrunch, Jul. 23, 2011, 4 pages.

Jason Kincaid, "Google Acquires Katango, The Automatic Friend Sorter", TechCrunch, Nov. 10, 2011, 2 pages.

Jennifer Van Grove, "Katango, after help from Facebook, gets acquired by Google", VentureBeat, Nov. 10, 2011, 3 pages.

International Searching Authority, "Notification of ransmittal of the International Search Report and the Written Opinion of the International Search Authority, or the Declaration," for International Application No. PCT/US2014/049283, dated Nov. 17, 2014, 4 pages.

European Patent Convention Examination Report for EP Application No. EP14832946.9-1217, dated Feb. 6, 2018, 8 pages.

* cited by examiner

INFERRING SOCIAL GROUPS THROUGH PATTERNS OF COMMUNICATION

CROSS-REFERENCE TO RELATED APPLICATION

This patent application is a continuation of U.S. Non-Provisional patent application Ser. No. 13/956,332, filed Jul. 31, 2013, entitled "Inferring Social Groups Through Patterns of Communication," which is incorporated herein by reference for all purposes.

BACKGROUND

As a user of an online social-networking service accumulates contacts or friends, the task of managing the content shared with them becomes more difficult.

For example, the user might want to share an off-color visual sight gag with the members of his/her bowling team, but not with his/her elderly parents.

Some online social-networking services allow a user to manually create groups of contacts for selective sharing. However, such a manual task becomes burdensome when it involves a large number of contacts, especially when performed using a mobile computing device such as a smartphone.

SUMMARY

Some implementations involve a processor-executed method. The method might be performed by the software for an online social-networking service. According to the method, the software authenticates the user of a social networking service which maintains one or more lists of contacts associated with the user that can be used by the user to selectively share content. The software ascertains a proposed group of contacts from at least one of the lists. The user and members of the proposed group are related by a plurality of communications and the communications are associated with one or more attributes including at least one of geographic locations associated with the communication, time of communication, or medium of communication. The software presents the proposed group of contacts to the user, with a recommendation that the user create a new list of contacts associated with the user from the proposed group of contacts. The software creates the new list of contacts from the proposed group, if the user indicates acceptance of the recommendation.

Other implementations involve an apparatus, namely, computer-readable storage media that persistently store a program. The program might be part of the software for an online social-networking service. The program authenticates the user of a social networking service which maintains one or more lists of contacts associated with the user that can be used by the user to selectively share content. The program ascertains a proposed group of contacts from at least one of the lists. The user and members of the proposed group are related by a plurality of communications and the communications are associated with one or more attributes including at least one of geographic locations associated with the communication, time of communication, or medium of communication. The program presents the proposed group of contacts to the user, with a recommendation that the user create a new list of contacts associated with the user from the proposed group of contacts. The program creates the new list of contacts from the proposed group, if the user indicates acceptance of the recommendation.

Still other implementations involve another processor-executed method. This method might also be performed by the software for an online social-networking service. According to the method, the software authenticates the user of a social networking service which maintains one or more lists of contacts associated with the user that can be used by the user to selectively share content. The software ascertains a proposed group of contacts from at least one of the lists. The user and members of the proposed group are related by a plurality of communications and the communications are associated with one or more attributes associated with the communications. The data for the one or more attributes is collected through a platform, through applications associated with a platform, or through a combination of a platform and applications associated with the platform. The software presents the proposed group of contacts to the user, with a recommendation that the user create a new list of contacts associated with the user from the proposed group of contacts. The software creates the new list of contacts from the proposed group, if the user indicates acceptance of the recommendation.

Other aspects and advantages of the implementations will become apparent from the following detailed description, taken in conjunction with the accompanying drawings, which illustrate by way of example the principles of the implementations.

DETAILED DESCRIPTION

In the following description, numerous specific details are set forth in order to provide a thorough understanding of the implementations described below. However, it will be apparent to one skilled in the art that some implementations may be practiced without some of these specific details. In other instances, process operations and implementation details have not been described in detail, if already well known.

Figure 1:
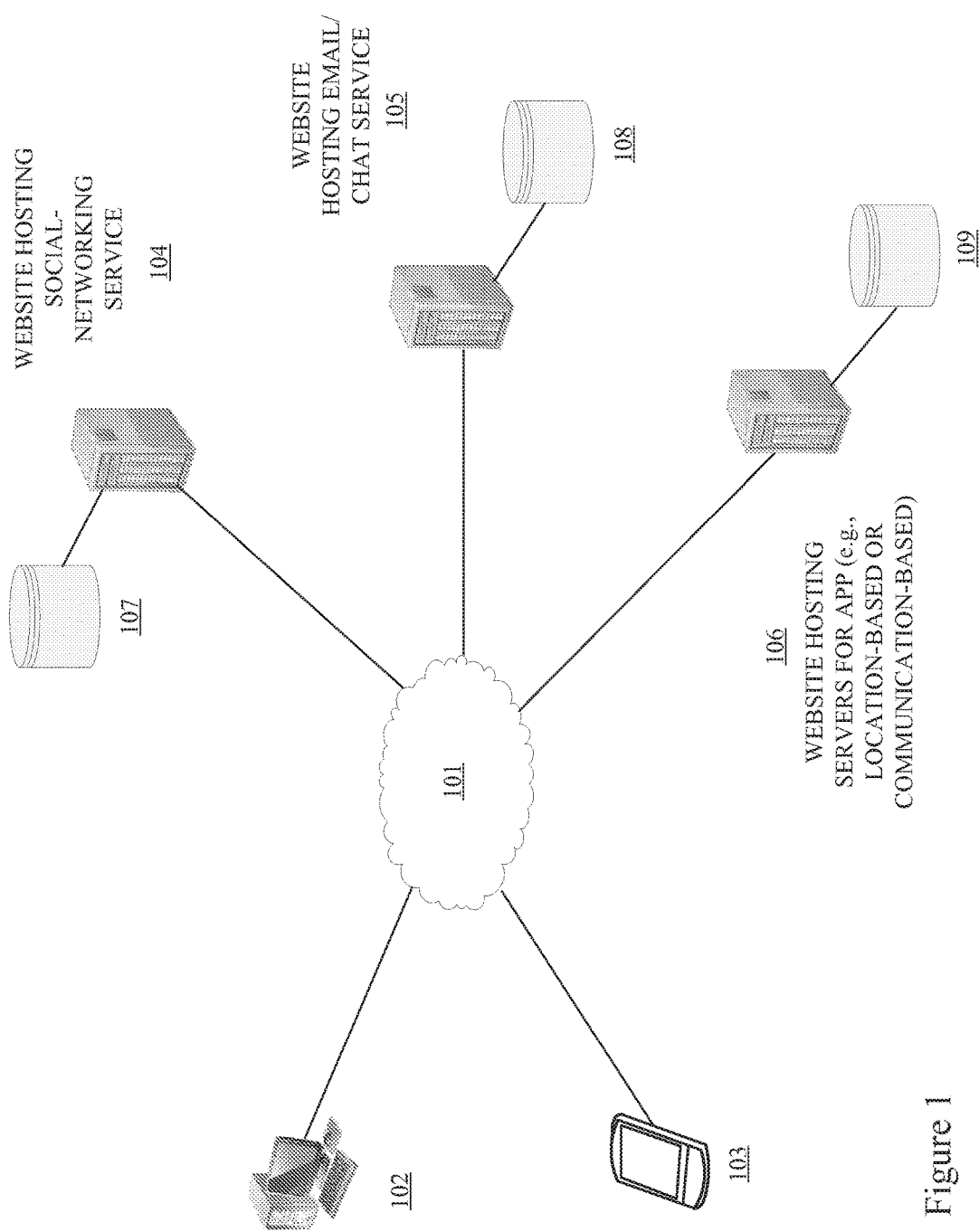
FIG. 1 is a diagram showing a communication network, in accordance with some implementations.

FIG. 1 is a diagram showing a communication network, in accordance with some implementations. As depicted in this figure, a personal computing device 102 and a mobile computing device 103 are connected by a network 101 (e.g., a wide area network (WAN) including the Internet, which might be wireless in part or in whole) with a website 104 hosting a social-networking service, a website 105 hosting an email and/or chat (e.g., instant messaging) service, and a website 106 hosting servers for a mobile application or "app" that is used for communication over network. As used here and elsewhere in this disclosure, the term "website hosting a social-networking service" is to be broadly interpreted to include any website that supports functionality for "bookmarking and sharing" content, including social-networking websites, social-media websites, blogging websites, online discussion websites, and websites that facilitate message transmission (e.g., according to a messaging protocol such as email, instant messaging, short message service (SMS), audio and/or video chat, etc.). In this regard, it will be appreciated that an email (e.g., spam) filter can be thought of as a type of control list for sharing (e.g., controlling access to or broadcasting) content, as can a whitelist and/or blacklist, a distribution list (d-list), a contact list, a buddy list, etc. In some implementations, the personal computing device 102 might be a laptop or other personal computer. And in some implementations, the mobile computing device 103 might be a smartphone or a tablet computer.

In some implementations, each of the websites 104, 105, and 106 might be composed of a number of servers connected by a network (e.g., a local area network (LAN) or a WAN) to each other in a cluster or other distributed system which might execute cloud platform software. The servers in website 104, 105, and 106 might also be connected to persistent storages 107, 108, and 109, respectively, which might include a storage area network (SAN). In some implementations, persistent storages 107, 108, and 109 might include flash memory and/or a redundant array of independent disks (RAID).

In some implementations, persistent storage 107 might be used to store control lists and content associated with users of the social-networking service hosted on website 104. Also, in some implementations, persistent storage 107 might be used to store logic (e.g., software) and data for the processes described below, including data related to the location (e.g., geographic or enumerated) of personal computing device 102 or mobile computing device 103 and/or communications whose source or destination is personal computing device 102 or mobile computing device 103. Some of that data might have been retrieved (e.g., through an application programming interface or API) from: (a) the email/chat service hosted on website 105, where the data might have been stored in persistent storage 108; and/or (b) the website 106, hosting servers for an app (e.g., location-based or communication based), where the data might have been stored in persistent storage 109.

Figure 2:
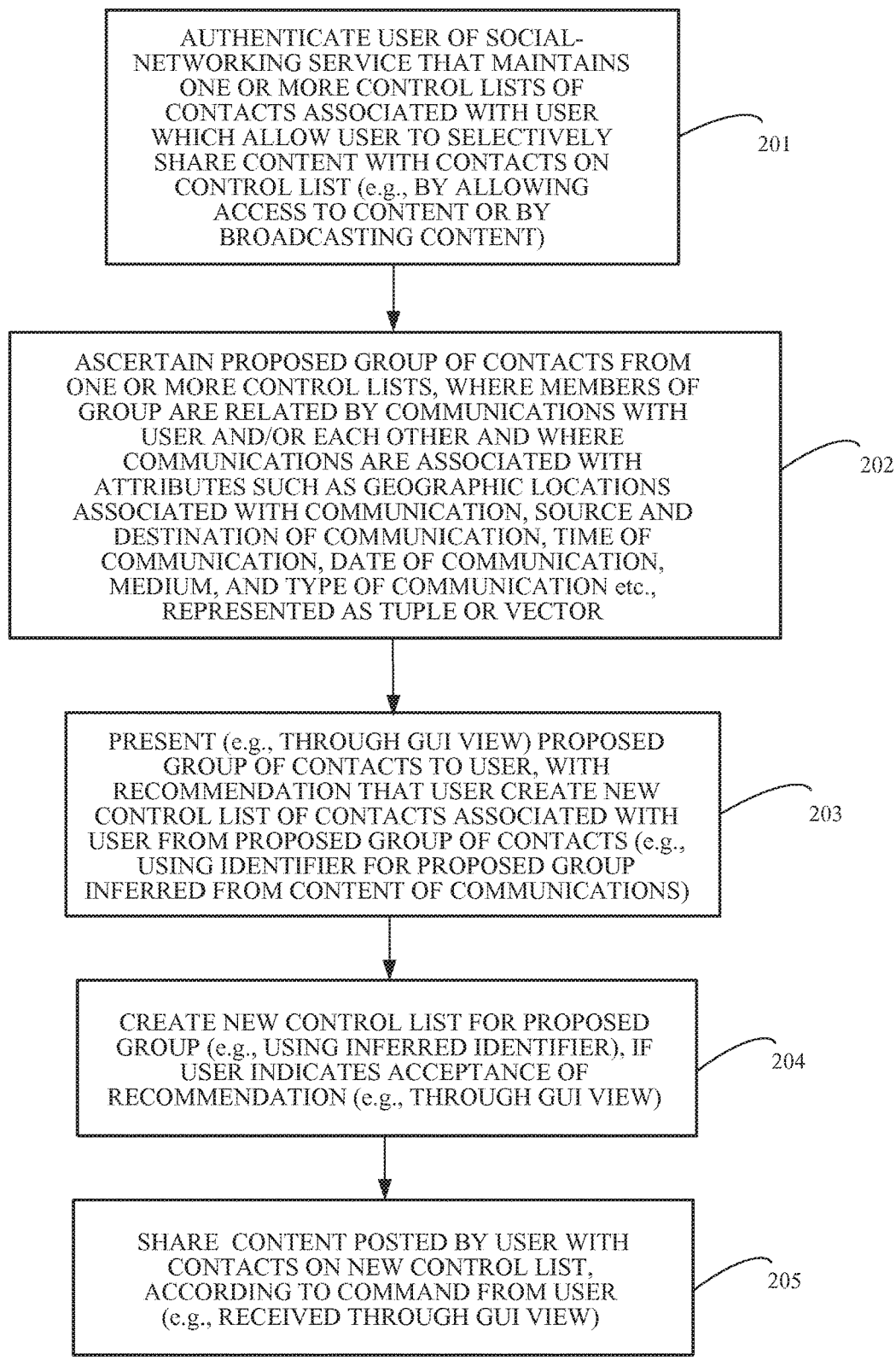
FIG. 2 is a flowchart diagram that illustrates a process for recommending a proposed group of contacts from the contacts on one or more control lists for a member of a social-networking service, in accordance with some implementations.

FIG. 2 is a flowchart diagram that illustrates a process for recommending a proposed group of contacts from the contacts on control lists for a member of an online social-networking service, in accordance with some implementations. In some implementations, one or more of the operations in this process might be performed by software running on servers in website 104, e.g., a website hosting a social-networking service. Also, in some implementations, one or more of the operations in these processes might be performed by software running on personal computing device 102 or mobile computing device 103, e.g., instructions in a webpage read by a browser supporting HTML5, CSS3, and JavaScript or ActionScript or instructions in an app executing on a smartphone.

As depicted in FIG. 2, software (e.g., running on servers in website 104) authenticates a user of a social-networking service that maintains one or more control lists of contacts associated with the user which allows the user to selectively share content with the contacts on the control list (e.g., by allowing access to content or by broadcasting content), in operation 201. Such a control list is analogous to an access control list (ACL) used by a file system. Such a control list is also analogous to a distribution list (d-list) used by an email service. In some implementations, the content might include a link (e.g., a Uniform Resource Locator or URL) or other text, an image, a document, audio, video, etc.

In operation 202, the software ascertains a proposed group of contacts from the control lists, in some implementations. The proposed group might be a subset of the contacts on one or more of the control lists. Or the proposed group might be a superset of the contacts on one or more of the control lists. In some implementations, the members of the group might be related by communications with the user or between each other. Further, each of those communications might be associated with one or more attributes such as the locations (e.g., geographic or enumerated) related to a communication, the source and destination of a communication, the time of a communication, the date of a communication, the medium of a communication, the type of a communication, etc.

In some implementations, the data for the attributes might have been retrieved using APIs from websites hosting an email/chat service or a website hosting servers for an app, as described above. Also, in some implementations, the data for the attributes might have been collected using a platform (e.g., an operating system for a mobile computing device), an app, and/or an app that is serves as a platform for another app. And in some implementations, the attributes and/or statistics based on the attributes (e.g., frequencies as described below) might be represented as a tuple or vector, in order to facilitate processing during the ascertaining operation.

In operation 203 in FIG. 2, the software presents (e.g., through a GUI view) the proposed group of contacts to the user, with a recommendation that the user create a new control list of contacts associated with the user from the proposed group of contacts (e.g., using an identifier for the proposed group inferred from the content of the communications). And in operation 204, the software creates a new control list for the proposed group (e.g., using the inferred identifier), if the user indicates acceptance of recommendation (e.g., through a GUI view). Then, in operation 205, the software shares content posted by the user with the contacts on the new control list, according to a command from the user (e.g., received through a GUI view).

As indicated above, the communications might be associated with attributes such as the locations (e.g., geographic or enumerated) related to a communication, the source and destination of a communication, the time of a communication, the date of a communication, the medium of a communication, and the type of a communication. In some implementations, the software might determine the geographic locations related to a communication using the computing device which transmits the communication and the computing device which ultimately receives the communication. In turn, the geographic location for a computing device might be determined using: (a) a global-positioning system (GPS); (b) a WiFi positioning system, which includes an indoor positioning system; (c) multilateration, e.g., using radio towers; (d) data such as "check-ins" retrieved from location-based social media; and/or (e) a hybrid system that uses a combination of (a), (b), (c), or (d).

In some implementations, the software might determine the enumerated location for a communication from the user or from the hardware/firmware/software for a computing device. For example, a user might indicate that he/she is using the computing device at "home" or the computing device at "work". Or the computing device itself might indicate that it is at "home" or at "work", e.g., on the basis of an entry in a registry database.

Similarly, in some implementations, the software might determine the time of a communication and/or the date of a communication from the computing device that transmits the communication or a computing device that receives the communication. In some implementations, data as to time and date might included in the control data for a communication, e.g., in the communication's header. It will be appreciated that the control (or header) data might also be used to determine the medium of a communication, e.g., if the control data corresponds to a communication protocol (e.g., an email protocol, a Short Message Service (SMS) protocol for text messages, an instant messaging protocol, etc.). In some implementations, the medium of a communication might not involve a communication protocol, e.g., communications made through the social-networking service, including sharing and direct messaging.

Also, the control (or header) data for a communication might include the source and destination for the communication, in accordance with a communication protocol (e.g., an email protocol, a Short Message Service (SMS) protocol for text messages, an instant messaging protocol, etc.). If the communication is a phone call, the source might be determined from caller identification (caller ID) data. Or the source and the destination might be determined by hardware/firmware/software on the computing devices transmitting and receiving the phone call.

In some implementations, the software might determine the type of a communication from an analysis (e.g., lexical, semantic, lexical-semantic hybrid, etc.) of the body or content of the communication. For example, if the content of the communication pertains to a software project, the software might be able to classify the communication as a "software project" communication or more generally as a "work" communication.

Figure 3A:
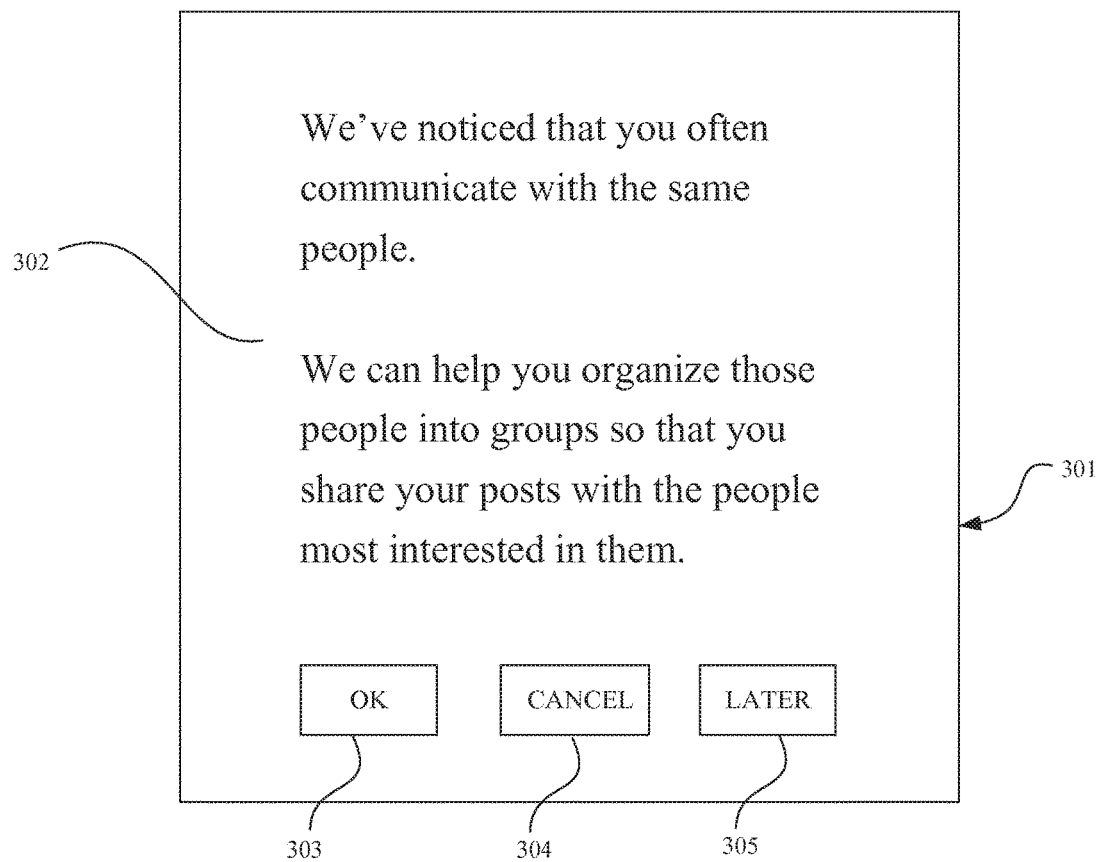
FIG. 3A is an initial GUI (graphical user interface) dialog for recommending a proposed group of contacts from the contacts on one or more control lists for a member of a social-networking service, in accordance with some implementations.

FIG. 3A is an initial GUI dialog for recommending a proposed group of contacts from the contacts on the control lists for a member of a social-networking service, in accordance with some implementations. In some implementations, this GUI dialog might be displayed by a client program (e.g., an application/app or a browser displaying a web page with JavaScript or ActionScript) for the social-networking service on a computing device such as personal computing device 102 or mobile computing device 103. In some implementations, the GUI dialog might be implemented as a modal view that prevents user workflow with the client program. In other implementations, the GUI dialog might implemented as a non-modal (or modeless) view that appears in a relatively inconspicuous part of the GUI, e.g., toward the right side of the GUI. In still other implementations, the GUI dialog might be implemented as a tooltip (or infotip).

As shown in FIG. 3A, GUI dialog 301 includes a textbox 302 that states: "We've noticed that you often communicate with the same people. We can help you organize those people into groups so that you share your posts with the people most interested in them." GUI dialog 301 also includes three GUI buttons. If the user clicks GUI button 303 labeled "OK", the client program will display another GUI dialog that assists the user with creating a new control list, as described further below. If the user clicks GUI button 304 labeled "CANCEL", the client program will close the GUI dialog 301 and will not display it for a relatively long period of time, e.g., approximately two weeks or so. If the user clicks GUI button 305 labeled "LATER", the client program will close the GUI dialog 301 and will not display it for a relatively short period of time, e.g., approximately two days or so.

Figure 3B:
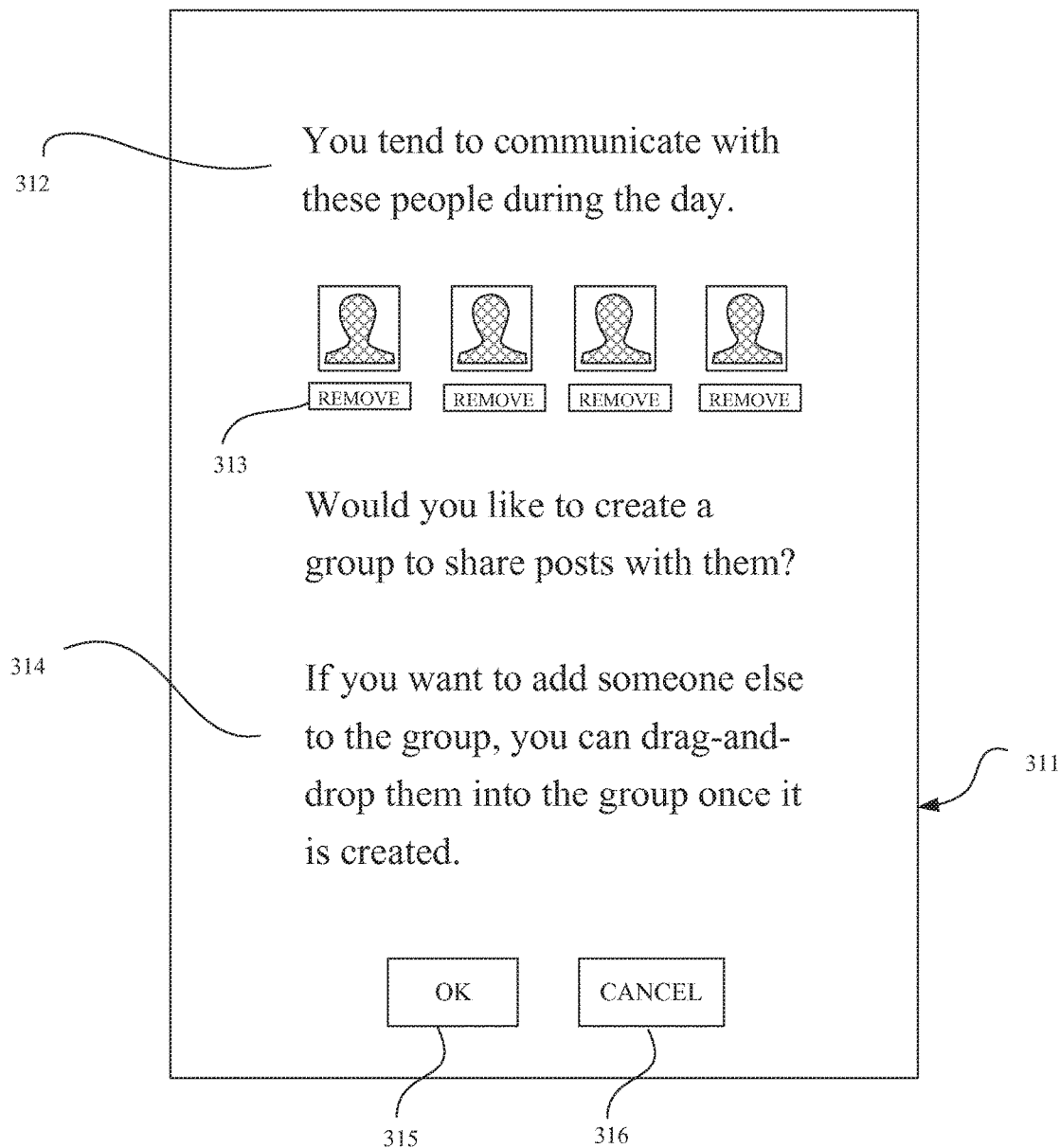
FIG. 3B is a GUI dialog for displaying a proposed group of contacts from the contacts on a member's control lists, in accordance with some implementations.

FIG. 3B is a GUI dialog for displaying a proposed group of contacts from the contacts on a member's control lists, in accordance with some implementations. Here again, in some implementations, this GUI dialog might be displayed by a client program for the social-networking service on a computing device such as personal computing device 102 or mobile computing device 103. In some implementations, the GUI dialog might be implemented as a modal view. In other implementations, the GUI dialog might be implemented as a non-modal (or modeless) view or as a tooltip (or infotip).

As shown in FIG. 3B, GUI dialog 311 that shows the profile images for a proposed group of contacts below a text box 312 stating: "You tend to communicate with these people during the day." Beneath each of the profile images is a GUI button (e.g., GUI button 313) labeled "REMOVE" that the user can use to eliminate the contact associated with the GUI button as a potential candidate for the new control list. Beneath the GUI buttons is another text box 314 that states: "Would you like to create a group to share posts with them? If you want to add someone else to the group, you can drag-and-drop them into the group once it is created."

GUI dialog 311 also includes two other GUI buttons. If the user clicks GUI button 315 labeled "OK", the client program will display another GUI dialog that assists the user with naming the new control list, as described further below. If the user clicks GUI button 316 labeled "CANCEL", the client program will close the GUI dialog 301 and the software (e.g., software running on the servers at the website hosting the social-networking service) will take no further action with respect to the proposed group, e.g., until the user indicates a subsequent willingness to entertain the recommendation (e.g., through another GUI dialog) or until the proposed group works its way back to the top of a queue (e.g., FIFO, weighted, priority, etc.). In some implementations, the queue might be weighted and the weight might be reduced according to the number of refusals which the user has made with respect to the proposed group.

Figure 3C:
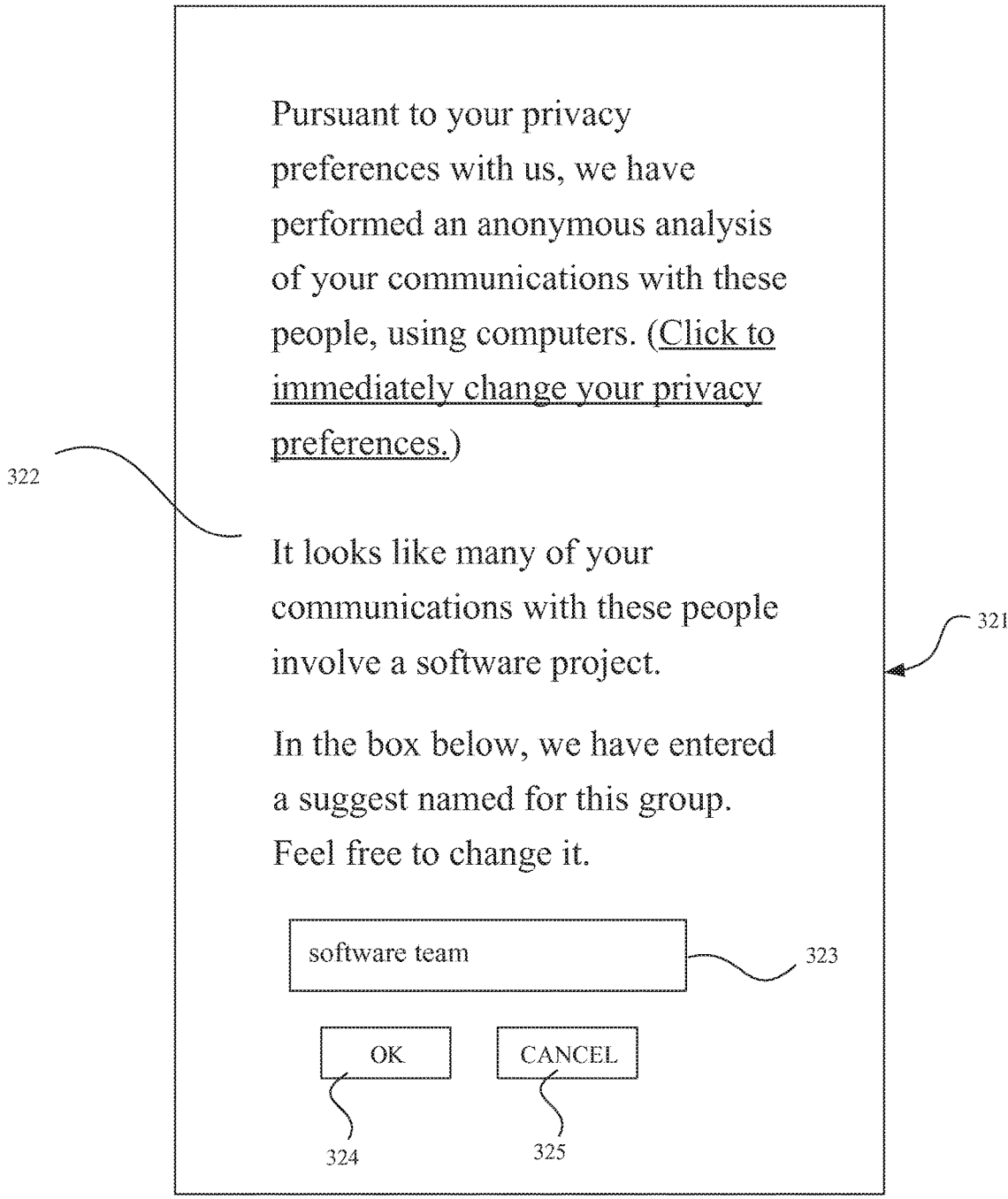
FIG. 3C is a GUI dialog for obtaining an identifier for a new control list, in accordance with some implementations.

FIG. 3C is a GUI dialog for obtaining an identifier for a new control list, in accordance with some implementations. Here again, in some implementations, this GUI dialog might be displayed by a client program for the social-networking service on a computing device such as personal computing device 102 or mobile computing device 103. In some implementations, the GUI dialog might be implemented as a modal view. In other implementations, the GUI dialog might be implemented as a non-modal (or modeless) view or as a tooltip (or infotip).

As shown in FIG. 3C, GUI dialog 321 includes a text box 322 that states as follows: "Pursuant to your privacy preferences with us, we have performed an anonymous analysis of your communications with these people, using computers. (Click to immediately change your privacy preferences.) It looks like many of your communications with these people involve a software project. In the box below, we have entered a suggested name for this group. Feel free to change it." In some implementations, the underlined language is hyperlink (e.g., a URL) that will take the user to a web page that allows the user to change his/her privacy preferences, if the user clicks on the hyperlink.

As indicated by the quoted language, the software (e.g., software running on the servers at the website hosting the social-networking service) might infer an identifier for the new control list from an analysis (e.g., a keyword/metadata analysis performed offline or near-online) of the content of the communications that were used to identify the contacts for the group, including earlier communications (e.g., sharing and direct messaging) through the social-networking service. Or the software might infer an identifier for the proposed group from the control (or header) data of the communications (e.g., the subject) or from the control lists associated with the user. For example, if all the contacts in a group share the same last name on a control list associated with the user (e.g., "Johnson"), the software might infer an identifier for the new control list such as "Johnson family". GUI dialog 321 also includes an edit box 323 which includes the recommended identifier (e.g., "software team"). The user can accept the recommended identifier by clicking on a GUI button 324 labeled "OK", which is located beneath the edit box 323. In some implementations, if the user clicks GUI button 324 or enters his/her own identifier for the new control list in the edit box 323, the software (e.g., the software running on the server) will create a new control list that the user can use for the purposes of sharing content through the social-networking service.

Also beneath the edit box 323 is a GUI button 325 labeled "CANCEL". If the user clicks that GUI button, the client program will close the GUI dialog 321 and the software (e.g., software running on the servers at the website hosting the social-networking service) will take no further action with respect to the proposed group, e.g., until the user indicates a subsequent willingness to entertain the recommendation (e.g., through another GUI dialog) or until the proposed group works its way back to the top of a queue (e.g., FIFO, weighted, priority, etc.). In some implementations, the queue might be weighted and the weight might be reduced according to the number of refusals which the user has made with respect to the proposed group.

Figure 3D:
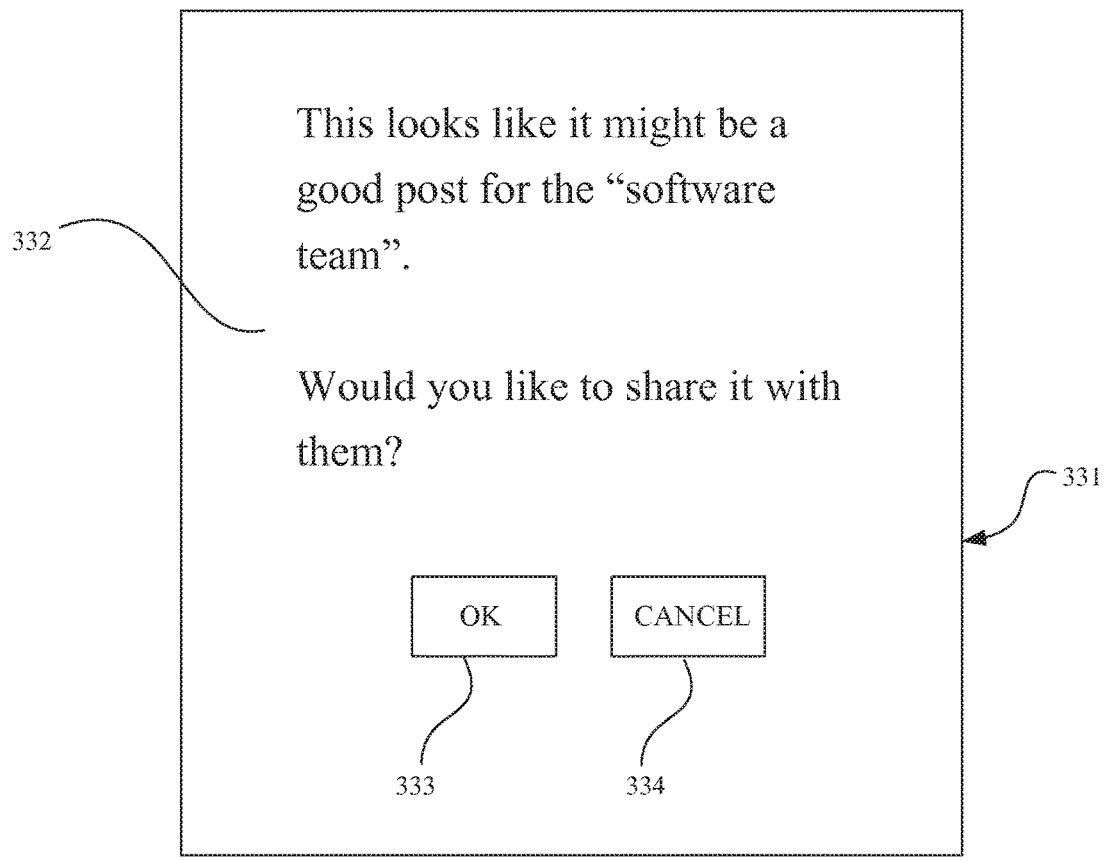
FIG. 3D is a GUI dialog for recommending a control list for a post by a member of a social-networking service, in accordance with some implementations.

FIG. 3D is a GUI dialog for recommending a control list for a post by a member of a social-networking service, in accordance with some implementations. Here again, in some implementations, this GUI dialog might be displayed by a client program for the social-networking service on a computing device such as personal computing device 102 or mobile computing device 103. In some implementations, the GUI dialog might be implemented as a modal view. In other implementations, the GUI dialog might be implemented as a non-modal (or modeless) view or as a tooltip (or infotip).

In some implementations, this GUI dialog might be displayed as a user finishes entering a post to be shared through the social-networking service or shortly (e.g., within approximately thirty seconds) after the user finishes entering the post. As shown in FIG. 3D, GUI dialog 331 includes a text box 332 that states as follows: "This looks like it might be a good post for the "software team". Would you like to share it with them?" GUI dialog 331 also included two GUI buttons. If the user clicks GUI button 333 labeled "OK", the post will be shared with group identified as "software team". If the user clicks GUI button 334 labeled "CANCEL", the client program will close the GUI dialog 331 without causing the post to be shared with that group. In some implementations, the software (e.g., software running on the servers at the website hosting the social-networking service) might infer a recommended group for a post by matching (e.g., online or near-online matching of keywords including metadata) the content of the post with the content of earlier posts and communications by the group, which might be pre-processed offline.

Figure 4:
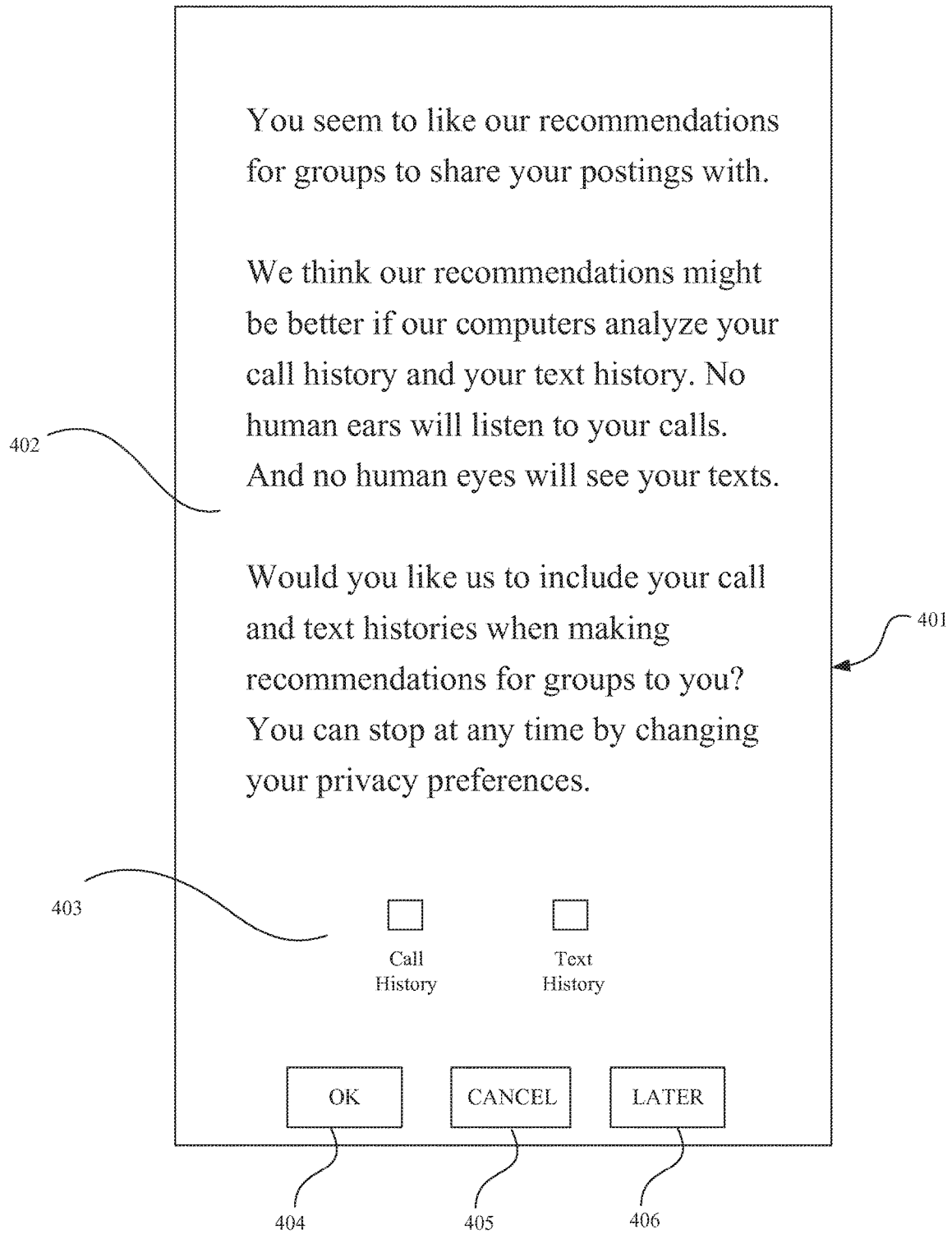
FIG. 4 is a GUI dialog for obtaining authority to use a member's call history and text history for making recommendations as to proposed groups of contacts, in accordance with some implementations.

FIG. 4 is a GUI dialog for obtaining authority to use a member's call history and text history for making recommendations as to proposed groups of contacts, in accordance with some implementations. Here again, in some implementations, this GUI dialog might be displayed by a client program for the social-networking service on a computing device such as personal computing device 102 or mobile computing device 103. In some implementations, the GUI dialog might be implemented as a modal view. In other implementations, the GUI dialog might be implemented as a non-modal (or modeless) view or as a tooltip (or infotip).

As shown in FIG. 4, GUI dialog 401 includes a text box 402 that states as follows: "You seem to like our recommendations for groups to share your postings with. We think our recommendations might be better if our computers analyze your call history and your text history. No human ears will listen to your calls. And no human eyes will see your texts. Would you like us to include your call and text histories when making recommendations for groups to you? You can stop at any time by changing your privacy preferences." Beneath text box 402 are two check boxes 403 which allow the user to make his/her call history, text history, or both call history and text history available for analysis, e.g., by the software running on the servers at the website hosting the social-networking service.

GUI dialog 401 also includes three GUI buttons. If the user clicks GUI button 404 labeled "OK", the client program will communicate the user's choice to the software running on the servers at the website hosting the social-networking service, so that the call history and text history can be retrieved (e.g., through an API exposed by a telephone/telecommunications service) and/or monitored (e.g., by the user's mobile device). If the user clicks GUI button 405 labeled "CANCEL", the client program will close the GUI dialog 401 and it will not be displayed for a relatively long period of time, e.g., approximately two months or so. If the user clicks GUI button 406 labeled "LATER", the client program will close the GUI dialog 401 and it will not be displayed for a relatively short period of time, e.g., approximately two days or so.

Figure 5:
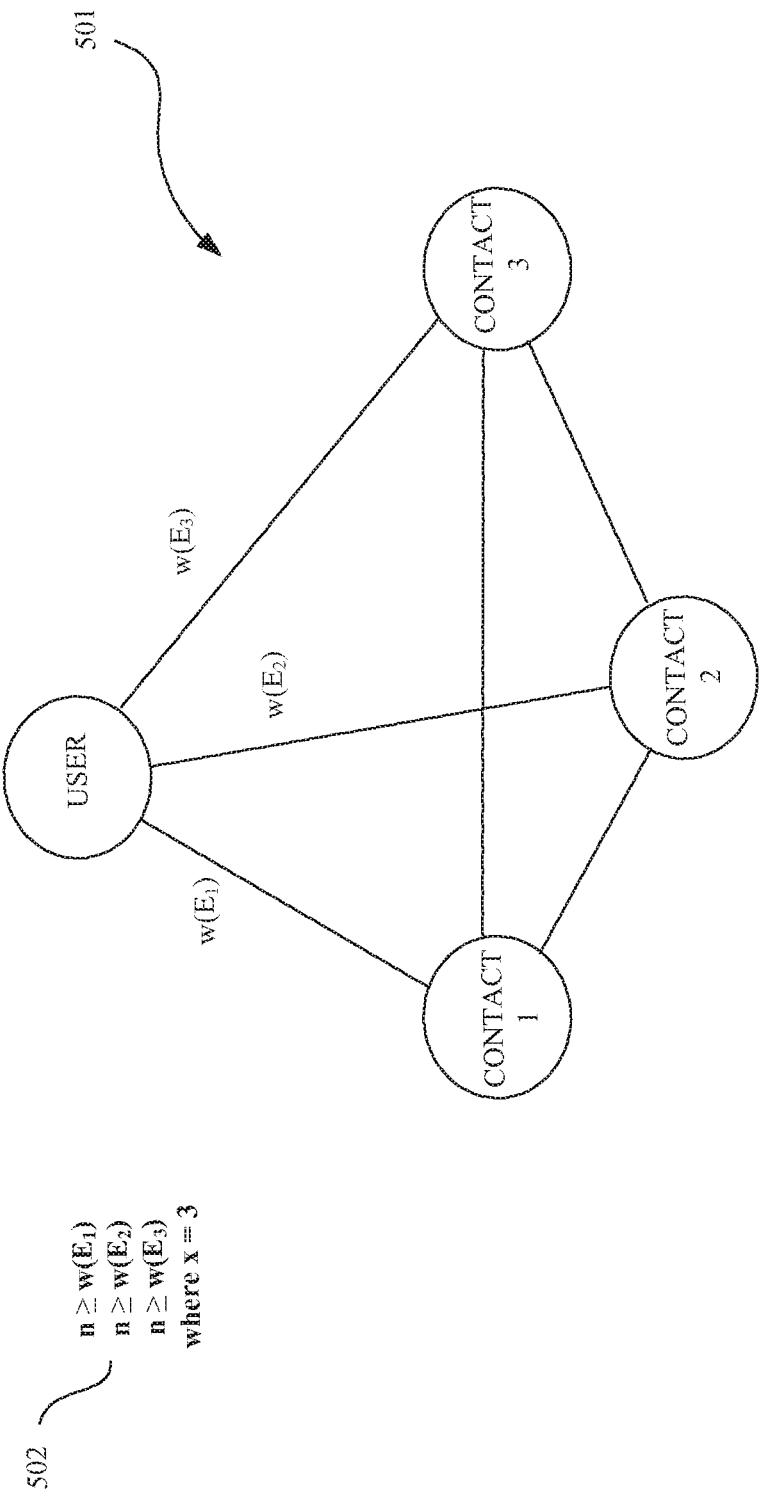
FIG. 5 is an example of a weighted graph based on geographical distance and communications, in accordance with some implementations.

FIG. 5 is an example of a weighted graph based on geographical distance and communications, in accordance with some implementations. Such a weighted graph might be used by the software running on the servers at the website hosting the social-networking service, when ascertaining a proposed group of contacts to recommend to a user. As depicted in this figure, weighted graph 501 includes four nodes labeled USER, CONTACT 1, CONTACT 2, and CONTACT 3. Edge $E_1$ connects node USER with node CONTACT 1. Edge $E_2$ connects node USER with node CONTACT 2. And Edge $E_3$ connects node USER with node CONTACT 3. The geographical distance between node USER and node CONTACT 1 is given by $w(E_1)$, where w is a weighting function that maps $E_1$ to a geographical distance, e.g., measured in kilometers or miles. Similarly, the geographical distance between node USER and node CONTACT 2 is given by $w(E_2)$ and the geographical distance between node USER and node CONTACT 3 is given by $w(E_3)$. As indicated by the legend 502, a group of contacts might be specified by a variable x (e.g., 3) that represents the desired number of contacts in the group and a variable n (e.g., 10 kilometers) which represents a maximum geographical distance between the user and a contact, in some implementations. In some implementations, the geographical distance might be relative, rather than absolute, e.g., where the user lives in the United States but all of the contacts in the group live in Europe. Also, in other implementations, other values for the variables x and n might be used or other variables might be included or employed. These examples are intended as illustrative rather than limiting.

Figure 6:
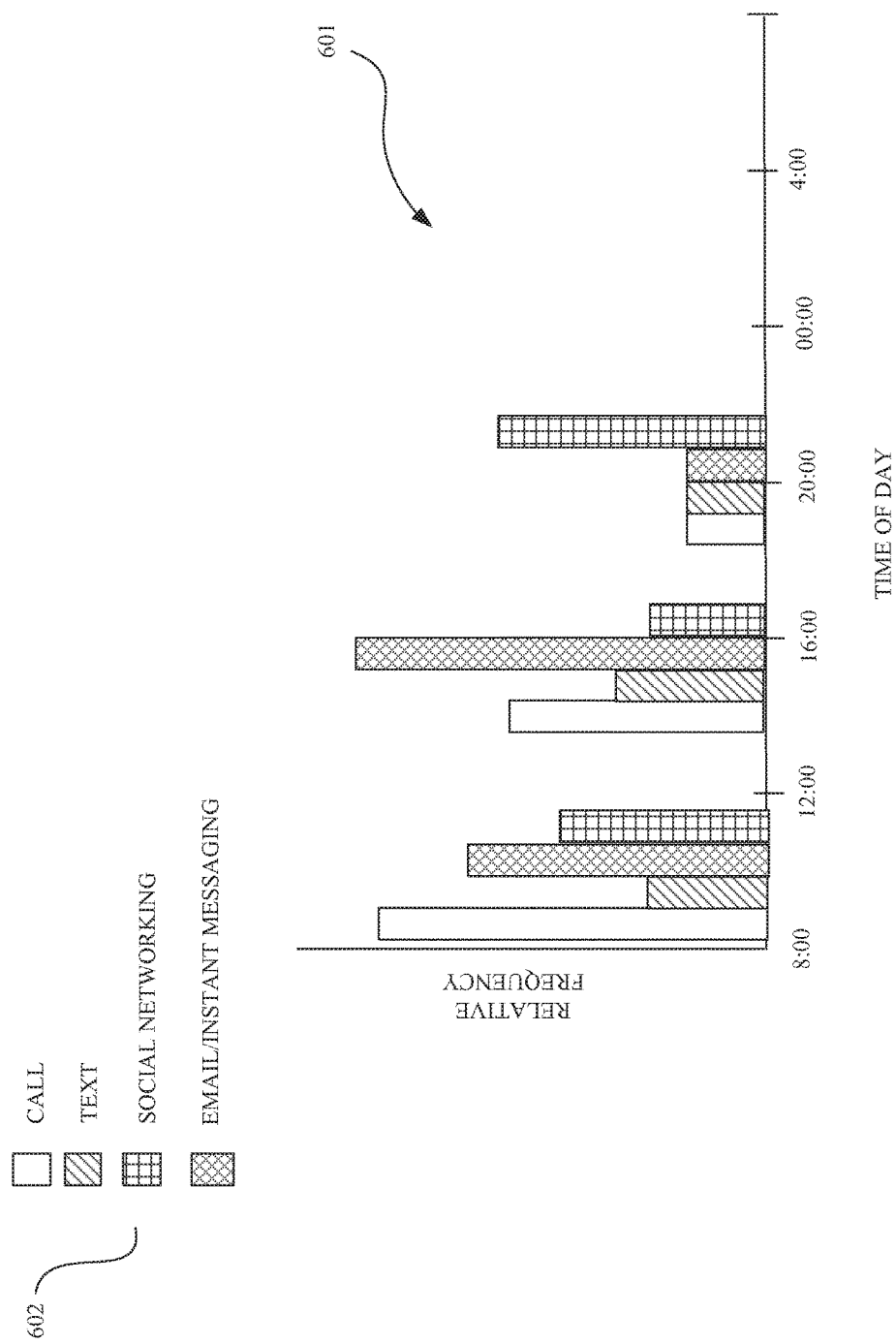
FIG. 6 is an example of a histogram based on medium of communications and time of day, in accordance with some implementations.

FIG. 6 is an example of a histogram based on medium of communications and time of day, in accordance with some implementations. Here again, such a histogram might be used by the software running on the servers at the website hosting the social-networking service, when ascertaining a proposed group of contacts to recommend to a user. As depicted in this figure, histogram 601 shows the relative frequency of communications between the user and his/her contacts (a) by medium of communication and (b) by time of day. The mediums of communication are identified by the visual patterns shown in legend 602: CALL, TEXT, SOCIAL NETWORKING, and EMAIL/INSTANT MESSAGING. As shown by histogram 601, most of the communications during morning hours (e.g., work hours) tend to be calls and emails, with calls predominating. However, the communications include a significant number of texts in the morning. During afternoon hours (e.g., work hours), most of the communications still tend to be calls and emails, but now emails predominate. Here again, the communications include a significant number of texts. However, during evening hours (e.g., non-work hours) most of the communications tend to be through social networking.

In other implementations, the histogram used by the software might be based on other attributes (or statistics based on those attributes), such as geographic locations related to a communication, geographic distances related to a communication, source and destination of a communication, date of a communication, type of communication, etc.

So, for example, the software might infer a proposed group (e.g., of co-employees) from the contacts of the user who the user communicates with through calls during the morning and afternoon hours. Or, as another example, the software might infer a proposed group (e.g., of family members) from the contacts of the user who user communicates with by texting during morning and afternoon hours.

Returning to FIG. 1, personal computing device 102 and the servers at websites 104, 105, and 106 might include (1) hardware consisting of one or more microprocessors, volatile storage (e.g., RAM), and persistent storage (e.g., flash memory or a hard disk or solid-state drive), and (2) an operating system that runs directly or indirectly (e.g., through virtualization software) on the hardware. Alternatively, the operating system for the servers at websites 104, 105, and 106 might be replaced by a hypervisor or other virtualization software. In some implementations, mobile computing device 103 might be a smartphone, tablet computer, or other mobile device that includes (1) hardware consisting of one or more low-power microprocessors, volatile storage (e.g., RAM), and persistent storage (e.g., flash memory such as microSD) and (2) an operating system that runs on the hardware.

In some implementations, personal computing device 102 and/or mobile computing device 103 might include a web browser as an application program or part of an operating system. It will be appreciated that users of personal computing device 102 and/or mobile computing device 103 might use browsers to communicate with software running on the servers at websites 104, 105, and 106. Alternatively, users of personal computing device 102 and/or mobile computing device 103 might use other application programs to communicate with software running on the servers at websites 104, 105, and 106.

In some implementations, the webserver and database software for the servers in websites 104, 105, and 106 might be implemented using a public, private, or hybrid-cloud platform, e.g., a hybrid cloud platform with a public cloud and a private cloud. In other implementations, software for the servers in websites 104, 105, and 106 might be implemented without resort to third-party cloud platforms, e.g., using webserver software, structured or unstructured database-management software, load balancing and virtualization software, distributed memory-caching software, other distributed computing software, etc.

With the above implementations in mind, it should be understood that they might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the implementations are useful machine operations. The implementations also relate to a device or an apparatus for performing these operations. The apparatus may be specially constructed for the required purposes, such as the carrier network discussed above, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The implementations can also be embodied as computer readable code on a computer readable medium. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, DVDs, Flash, magnetic tapes, and other optical and non-optical data storage devices. The computer readable medium can also be distributed over a network coupled computer systems so that the computer readable code is stored and executed in a distributed fashion.

Although implementations of the implementations have been described in some detail for purposes of clarity of understanding, it will be apparent that certain changes and modifications can be practiced within the scope of the following claims. The operations described above can be ordered, modularized, and/or distributed in any suitable way. Accordingly, the present implementations are to be considered as illustrative and not restrictive, and the implementations are not to be limited to the details given herein, but may be modified within the scope and equivalents of the following claims. In the following claims, elements and/or steps do not imply any particular order of operation, unless explicitly stated in the claims or implicitly required by the disclosure.

What is claimed is:

1. A method comprising:
ascertaining, by a processing device, a proposed group of contacts from contacts of a user based on:
a first association in geographic locations of communications between the user and the proposed group of contacts;
a second association in a type of medium of the communications, the type of medium comprising a communication protocol used to transmit the communications, wherein the communication protocol is ascertained from control data corresponding to the communications; and
a third association inferred from matching keywords and metadata of content of the communications to earlier matched content of communications between the user and the proposed group of contacts;
providing, to a user device of the user via a graphical user interface, a recommendation that the user create a new list of contacts associated with the user from the proposed group of contacts, wherein the recommendation comprises identification of the proposed group of contacts and a description of association between the user and the proposed group of contacts based on the first and second associations, and wherein the graphical user interface further comprises user-selectable elements to allow user removal of one or more contacts of the proposed group of contacts from the new list of contacts; and
responsive to receiving an indication of user acceptance of the recommendation from the user device via the graphical user interface, creating the new list of contacts associated with the user from the proposed group.

2. The method of claim 1, wherein attributes of each of the communications comprise one or more of source and destination of the communication, date of the communication, time of the communication, type of the communication, the geographic location of the communication, or the type of medium of the communication, and wherein the type of medium of communication indicates whether the communication was transmitted using an email protocol, a short message service (SMS) protocol, an instant messaging protocol, or the social networking service.

3. The method of claim 2, wherein the source and destination of the communication are determined from the control data, according to the communication protocol.

4. The method of claim 2, wherein data for the attributes is collected through at least one of a platform or applications associated with the platform.

5. The method of claim 4, wherein the platform comprises an operating system.

6. The method of claim 1, wherein content is selectively-shared on the social-networking service based on indications from a user device of the user, the indications to allow access to the content using the social-networking service, and wherein the content comprises one or more of a link, text, an image, a document, audio, or video.

7. The method of claim 1, wherein content is selectively-shared through the social-networking service based on indications from a user device to the user to broadcast the content using the social-networking service, and wherein the content comprises one or more of a link, text, an image, a document, audio, or video.

8. The method of claim 1, further comprising recommending an identifier for the proposed group inferred at least in part from content in the communications.

9. The method of claim 1, wherein the recommendation is presented to the user in one or more views in a graphical user interface (GUI).

10. The method of claim 9, wherein at least one of the views is a modal view.

11. A non-transitory computer-readable storage medium that stores instructions, which when executed, cause a processor to:
ascertain a proposed group of contacts from contacts of a user based on:
a first association in geographic locations of communications between the user and the proposed group of contacts;
a second association in a type of medium of the communications, the type of medium comprising a communication protocol used to transmit the communications, wherein the communication protocol is ascertained from control data corresponding to the communications; and
a third association inferred from matching keywords and metadata of content of the communications to earlier matched content of communications between the user and the proposed group of contacts;
provide, to a user device of the user via a graphical user interface, a recommendation that the user create a new list of contacts associated with the user from the proposed group of contacts, wherein the recommendation comprises identification of the proposed group of contacts and a description of association between the user and the proposed group of contacts based on the first and second associations, and wherein the graphical user interface further comprises user-selectable elements to allow user removal of one or more contacts of the proposed group of contacts from the new list of contacts; and
responsive to receiving an indication of user acceptance of the recommendation from the user device via the graphical user interface, create the new list of contacts associated with the user from the proposed group.

12. The non-transitory computer-readable storage medium of claim 11, wherein attributes of the communications comprise one or more of source and destination of the communication, date of the communication, geographical location of the communication, type of the communication, the geographical location of the communication, or the type of medium of the communication, and wherein the type of medium of the communication indicates whether the communication was transmitted using an email protocol, a short message service (SMS) protocol, an instant messaging protocol or the social networking service.

13. The non-transitory computer-readable storage medium of claim 12, wherein the source and destination of the communication are determined from the control data, according to the communication protocol.

14. The non-transitory computer-readable storage medium of claim 11, wherein the user selectively shares content by allowing access to the content using the social-networking service and wherein the content comprises at least one of a link, text, an image, a document, audio, or video.

15. The non-transitory computer-readable storage medium of claim 11, wherein content is selectively-shared on the social-networking service based on indications from a user device of the user, the indications to allow access to the content using the social-networking service, and wherein the content comprises one or more of a link, text, an image, a document, audio, or video.

16. The non-transitory computer-readable storage medium of claim 11, wherein the operations further comprise recommending an identifier for the proposed group inferred at least in part from content in the communications.

17. The non-transitory computer-readable storage medium of claim 11, wherein the presentation involves one or more views in a graphical user interface (GUI).

18. The non-transitory computer-readable storage medium of claim 12, wherein data for the attributes is collected through at least one of a platform or applications associated with the platform.

19. The non-transitory computer-readable storage medium of claim 18, wherein the platform includes an operating system.

20. A system comprising:
a memory; and
a processing device, coupled to the memory, to:
ascertain a proposed group of contacts from contacts of the user based on:
a first association in geographic locations of communications between the user and the proposed group of contacts;
a second association in a type of medium of the communications, the type of medium comprising a communication protocol used to transmit the communications, wherein the communication protocol is ascertained from control data corresponding to the communications; and
a third association inferred from matching keywords and metadata of content of the communications to earlier matched content of communications between the user and the proposed group of contacts;
provide, to a user device of the user via a graphical user interface, a recommendation that the user create a new list of contacts associated with the user from the proposed group of contacts, wherein the recommendation comprises identification of the proposed group of contacts and a description of association between the user and the proposed group of contacts based on the first and second associations, and wherein the graphical user interface further comprises user-selectable elements to allow user removal of one or more contacts of the proposed group of contacts from the new list of contacts; and
responsive to receiving an indication of user acceptance of the recommendation from the user device via the graphical user interface, create the new list of contacts associated with the user from the proposed group.

21. The system of claim 20, wherein attributes of the communications comprise one or more of source and destination of the communication, date of the communication, geographical location of the communication, type of the communication, the geographic location of the communication, or the type of medium of the communication, and wherein the type of medium of the communication indicates whether the communication was transmitted using an email protocol, a short message service (SMS) protocol, an instant messaging protocol or the social networking service.

* * * * *